(12) United States Patent
Nguyen et al.

(10) Patent No.: US 7,469,026 B2
(45) Date of Patent: Dec. 23, 2008

(54) RANDOM WALK FILTER TIMING RECOVERY LOOP

(75) Inventors: Tien M. Nguyen, Placentia, CA (US); James Yoh, Palos Verdes Peninsula, CA (US); Ashok Mathur, Duarte, CA (US); Gary W. Goo, Rolling Hills Estate, CA (US)

(73) Assignee: The Aerospace Corporation, El Segundo, CA (US)

( * ) Notice: Subject to any disclaimer, the term of this patent is extended or adjusted under 35 U.S.C. 154(b) by 586 days.

(21) Appl. No.: 10/092,758

(22) Filed: Mar. 7, 2002

(65) Prior Publication Data

US 2003/0169834 A1    Sep. 11, 2003

(51) Int. Cl.
    *H04L 25/38*    (2006.01)
    *H03D 3/22*    (2006.01)
(52) U.S. Cl. .................. 375/354; 375/362; 375/373; 375/375; 375/376
(58) Field of Classification Search ............. 375/120, 375/354–376; 713/400; 331/1 A; 328/63, 328/155
    See application file for complete search history.

(56) References Cited

U.S. PATENT DOCUMENTS

| | | | |
|---|---|---|---|
| 3,544,717 A * | 12/1970 | Smith ..................... 375/371 |
| 4,280,099 A * | 7/1981 | Rattlingourd ............... 327/160 |
| 5,097,489 A * | 3/1992 | Tucci ....................... 375/374 |
| 5,420,895 A * | 5/1995 | Kim ......................... 375/373 |
| 5,463,351 A * | 10/1995 | Marko et al. ................ 331/1 A |
| 5,553,081 A * | 9/1996 | Downey et al. .............. 714/709 |
| 5,577,080 A * | 11/1996 | Sakaue et al. ............... 375/376 |
| 5,661,765 A * | 8/1997 | Ishizu ....................... 375/376 |
| 6,167,526 A * | 12/2000 | Carlson ..................... 713/400 |

\* cited by examiner

*Primary Examiner*—David C Payne
*Assistant Examiner*—Linda Wong
(74) *Attorney, Agent, or Firm*—Derrick Michael Reid

(57) ABSTRACT

A timing recovery loop includes a random walk filter counter for counting early, nominal and late arrivals of data transitions pulses of an input baseband signal waveform encoding a digital bit stream, and provides magnitude counts that are compared to a threshold value that when exceeded by the magnitude counts results in a delay adjustment of the generated adjusted timing pulses then remaining synchronized with the actual bit timing for maintaining bit timing lock. The adjusted timing pulses can then be used by a data detector for reliable data detection and reconstruction of the digital bit stream. The threshold value can be adaptively adjusted for reducing drop lock rates in the presence of changing channel environments.

10 Claims, 2 Drawing Sheets

RANDOM WALK FILTER
TIMING RECOVERY LOOP

PULSE DETECTOR AND COMPARATOR

RANDOM WALK FILTER TIMING RECOVERY LOOP

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of digital communications. More particularly, the present invention relates to timing recovery loops for accurate detection and tracking of binary data streams.

BACKGROUND OF THE INVENTION

In a communication receiver, a received RF signal is demodulated to generate a baseband signal waveform containing a self-clocking bit stream of digital data. The baseband signal waveform is tracked using a timing recovery loop. The timing recovery loop tracks bit timing of the baseband signal waveform and generates timing pulses, which are then used in a data detector for sampling the baseband signal waveform at the bit intervals for reconstructing the digital bit stream from the received baseband signal waveform. The baseband signal waveform is subject to channel noise leading to poorly generated timing pulses and hence poor bit timing resulting in poor data detection. When the timing recovery loop loses track, the bit stream is no longer detected. The bit stream is recovered using conventional timing recovery loops that are subject to bit timing lock drop in the timing recovery loop.

The conventional timing recovery loops use early-and-late gates, digital transition tracking, filter-and-square, and delay-and-multiply functions. In bit timing detection, the bit stream is self clocking and the timing differential dithers about correct bit timing in the timing recovery loops. For mobile environments, these timing recovery loops drop lock when the loop signal-to-noise ratio (SNR) is smaller than a threshold value or the residual Doppler frequency is larger than the operating loop bandwidth. Timing recovery loops use slow bandwidth phase lock loops that drop lock at low SNR. After dropping lock, the conventional timing recovery loops disadvantageously experience long hang up time due to the need to reacquire the timing pulses.

Random walk filters have been used for decades in various applications. In the past, random walk filters have been applied to digital phase synchronization systems. Random walk filters have been theoretically applied to carrier phase detection where differentials between local references and transmitter carriers results in a phase correction that is unidirectional and constantly circular over 360 degrees. Although used for decades, random walk filters have not been adapted to improving the bit clock locking stability in timing recovery loops. Random walk filters have not been applied to recover bit timing information of a digital data stream. Existing timing recover loops suffer from drop of bit timing lock in noisy channels. Noisy channels suffer from ambiguous bit timing transitions leading to jittering and inaccurate timing pulses. These and other disadvantages are solved or reduced using the invention.

SUMMARY OF THE INVENTION

An object of the invention is to provide improved detection of a binary data stream encoded in a baseband signal.

Another object of the invention is to provide a timing recovery loop with a random walk filter counter for maintaining bit timing lock of a binary signal waveform.

Yet another object of the invention is to provide a timing recovery loop with a random walk filter counter counting early and late transitions of an input baseband binary signal waveform for adjusting generated timing pulses to the actual bit timing of the baseband binary signal waveform.

Still another object of the invention is to provide a timing recovery loop with a random walk filter counter counting early and late transitions of an input baseband binary signal waveform for adjusting generated timing pulses to the actual bit timing of the baseband binary signal waveform, and, with a threshold selector, determine when the accumulated early and late transitions exceed a predetermined threshold value for adjusting the generated timing pulses.

A further object of the invention is to provide a timing recovery loop with a random walk filter counter counting early and late transitions of an input baseband binary signal waveform for adjusting the generated timing pulses to the actual bit timing of the baseband binary signal waveform, and, with a threshold selector, determine when the accumulated early and late transitions exceed a predetermined threshold value for adjusting the generated timing pulses, with the threshold value being dynamically adjusted.

The invention is directed to a timing recovery loop enhanced with a random walk filter. The enhanced timing recovery loop achieves improvement in reduced timing jitter. A setable error threshold enables adaptive synchronization in the timing recovery loop, reduces drop lock rates and decreases the acquisition time. The dropped-lock rate is less frequent due to the setting of the threshold value of the random walk filter timing recovery loop. The threshold value can be adaptively reset. The random walk filter timing recovery loop provides faster acquisition time by adaptively setting the threshold value to changing channel environments. As an example, the threshold value can be based on the frequency of the adjustments to the generated timing pulses so as to provide responsive and yet not overly jittery adjustments.

An input baseband signal waveform containing a digital bit stream is detected to generate data transition pulses that are compared in time with locally generated and suitably delayed timing pulses to produce lead and lag signals to respectively increment and decrement a random walk filter timing counter. When the random walk filter timing counter output exceeds a positive or negative threshold, the delay for timing pulses is respectively adjusted in time forwards or backwards according to the sign of the exceeded threshold. With a stable input binary signal waveform, with accurate timing, and in a low noise channel, for example, an appropriately selected threshold value allows the lead and lag signals to cancel out in time, thus allowing the generated timing pulses to remain synchronized to the input binary signal waveform without delay adjustments. In noisy channels or with a Doppler shifted input signal, the input binary signal waveform skews in time. As the input binary signal waveform skews in early or late time relative to the generated timing pulses, the respective lead and lag signals accumulate over time, and when exceeding a threshold number, the generated timing pulses are adjusted early or late in relative time for improved tracked synchronized timing with the input binary signal waveform, so as to maintain bit timing lock. As such, the random walk filter continuously adjusts the generated timing pulses to maintain an accurate bit timing lock.

The timing recovery loop can be implemented with low power digital technology and is applicable to a wide range of modulation schemes that are well suited for enhanced mobile communications. The random walk filter timing recovery loop is expandable to accommodate a wide range of amplitude and phase modulation schemes, such as, BPSK, QPSK, GMSK, 16-QAM, and 64-QAM. These and other advantages will become more apparent from the following detailed description of the preferred embodiment.

DETAILED DESCRIPTION OF THE PREFERRED EMBODIMENT

Figure 1:
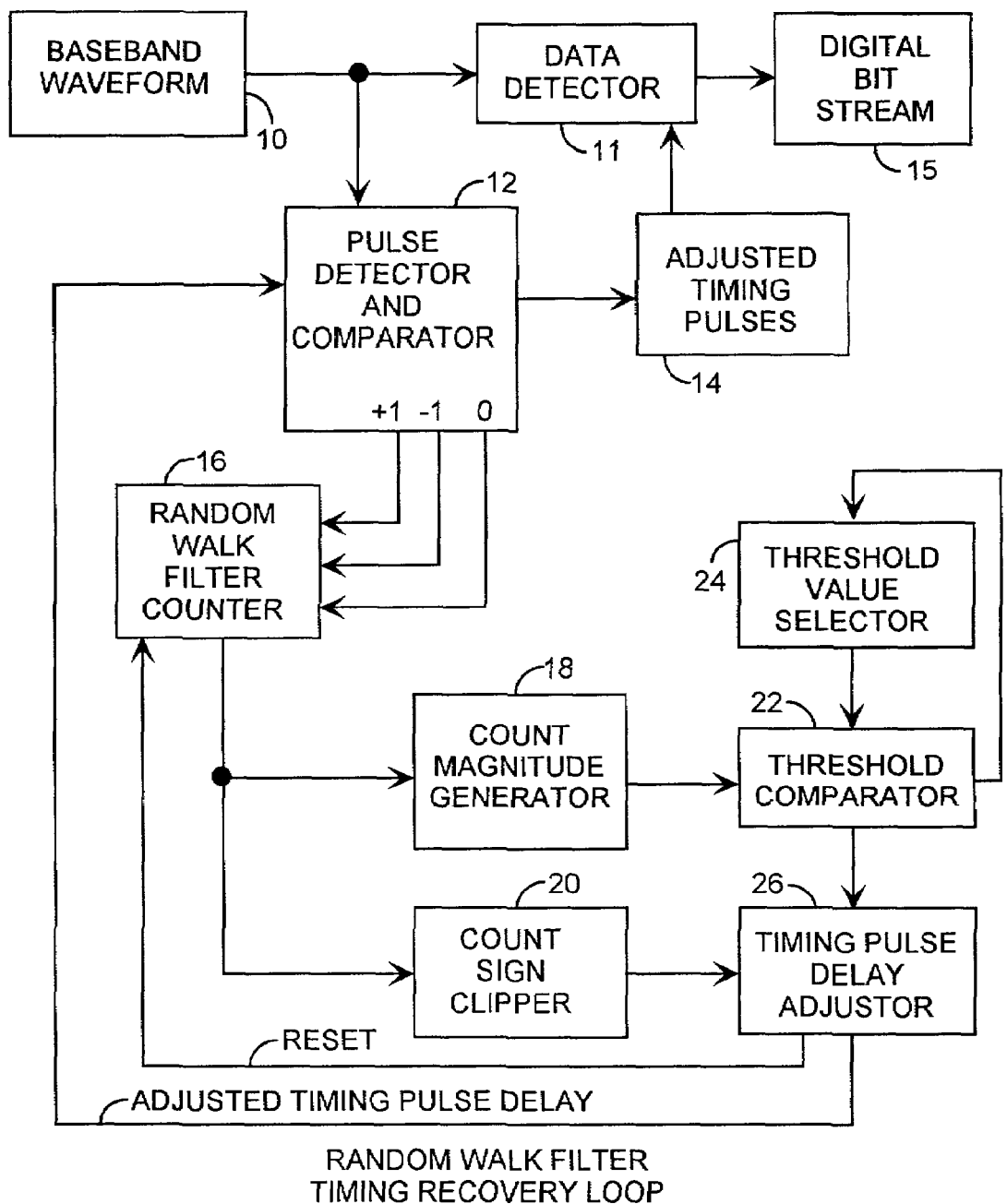
FIG. 1 is a block diagram of a random walk filter timing recovery loop.

An embodiment of the invention is described with reference to the figures using reference designations as shown in the figures. Referring to FIG. 1, a baseband signal waveform 10 carries an input digital bit stream of encoded data. The binary data and timing are encoded into the baseband signal waveform 10. The baseband signal waveform 10 is fed into a conventional data detector 11 and a pulse detector and comparator 12. The pulse detector and comparator 12 generates adjusted timing pulses 14 that can be used by the data detector 11 to sample the baseband signal waveform 10 to reconstruct the digital bit stream 15. The baseband signal waveform 10 has been carrier-demodulated.

The pulse detector and comparator 12 receives the baseband signal waveform 10 and generates the adjusted timing pulses 14. The data may be encoding onto the baseband signal in several different types of formats, such as binary pulse shift keying (BPSK). For example, BPSK encoding has zero crossings as transitions that may indicate bit timing with maxima and minima indicating binary ones and zeros, respectively. The pulse detector and comparator 12 detects the zero crossing transitions, generates data transition pulses, and compares the generated data transition pulses with the adjusted timing pulses that will be adjusted from time to time to allow for changes in the input baseband signal waveform over time during reception. The adjusted timing pulses 14 are adjusted to follow the data transition pulses for continuous reliable data detection by the data detector 11, resulting in a reconstructed digital bit stream 15 with a low error rate. The pulse detector and comparator 12 generates the data transition pulses from the baseband signal waveform 10 and compares the data transition pulses with the timing pulses for determining early, nominal and late arrivals of the data transition pulses relative to the timing pulses. Based on the comparison between the data transition pulses and adjusted timing pulses, −1 lead, 0 nominal, and +1 lag outputs are generated indicating the time relationship between the adjusted timing pulses and data transition pulses.

A random walk filter counter 16 receives lead, nominal, and lag outputs from the pulse detector and comparator 12 and generates a running count that is incremented, maintained, or decremented respectively by the lead, nominal, and lag outputs. The running count is fed to count magnitude generator 18 and a count sign clipper 20. The magnitude generator 18 generates a magnitude count that is fed to a threshold comparator 22, which receives a threshold value from a threshold value selector 24. The threshold value is a predetermined selected threshold value that can be changed in the face of different operating conditions. The threshold comparator 22 provides an input to the threshold value selector 24 for adaptive threshold selection preferably based on the rate at which the threshold value is exceeded. The magnitude count is the magnitude of the running count. The count sign clipper 20 provides a plus or minus count sign to a timing pulse delay adjustor 26. The count sign is the sign of the running count from the random walk filter counter 16. The threshold comparator 22 compares the magnitude count with a threshold value selected by a threshold value selector 24.

The threshold comparator 22 generates an exceeded signal when the magnitude count of the running count from the magnitude generator 18 is greater than the selected threshold value. The threshold comparator 22 communicates the exceeded signal to the timing pulse delay adjustor 26. The count sign clipper 20 generates the count sign indicating the early or late timing of the magnitude count. When the running count exceeds the threshold value, and an exceeded signal is sent to the timing pulse delay adjustor 26, an additional timing delay adjustment is made in the generation of the adjusted timing pulses 14 in the pulse detector and comparator 12, which outputs the adjusted timing pulses 14 for data detection. The timing pulse delay adjustor 26 uses the count sign of the running count to adjust early and late in time by a fixed time period, resulting in an adjusted timing pulse delay 28 that is communicated to the pulse detector and comparator 12 that then appropriately adjusts the adjusted timing pulses 14 and then outputs the adjusted timing pulses 14. The early and late timing adjustment is made when triggered by the exceeded signal. The early and late timing adjustment to the adjusted timing pulses is in such a direction as to reduce the time difference between the adjusted timing pulses 14 and the data transition pulses of the baseband signal waveform 10.

The threshold value selector 24 preferably adaptively selects the threshold value depending on the channel environment. Either a training sequence or apriori knowledge of the channel propagation conditions can be used to initially set the threshold value to an initial threshold value. As the channel experiences excessive noise or continuous gross change in the actual bit timing, the threshold value comparator 22 can keep track of the rate at which the magnitude count exceeds the threshold, that is the rate of timing adjustments, and in the case of a low rate of magnitude counts exceeding the threshold value, resulting in few timing adjustments, the threshold comparator 22 can signal the threshold value selector 24 to select the next lower threshold value, or, in the case of a high rate of magnitude counts exceeding the threshold value, resulting in many timing adjustments, such as in the presence of excessive noise, the threshold comparator 22 can signal the threshold value selector 24 to select the next higher threshold value. In this manner, the threshold value is adaptively adjusted to be lower and higher by the threshold value selector 24, corresponding to channel conditions and changes to the actual bit timing.

Figure 2:
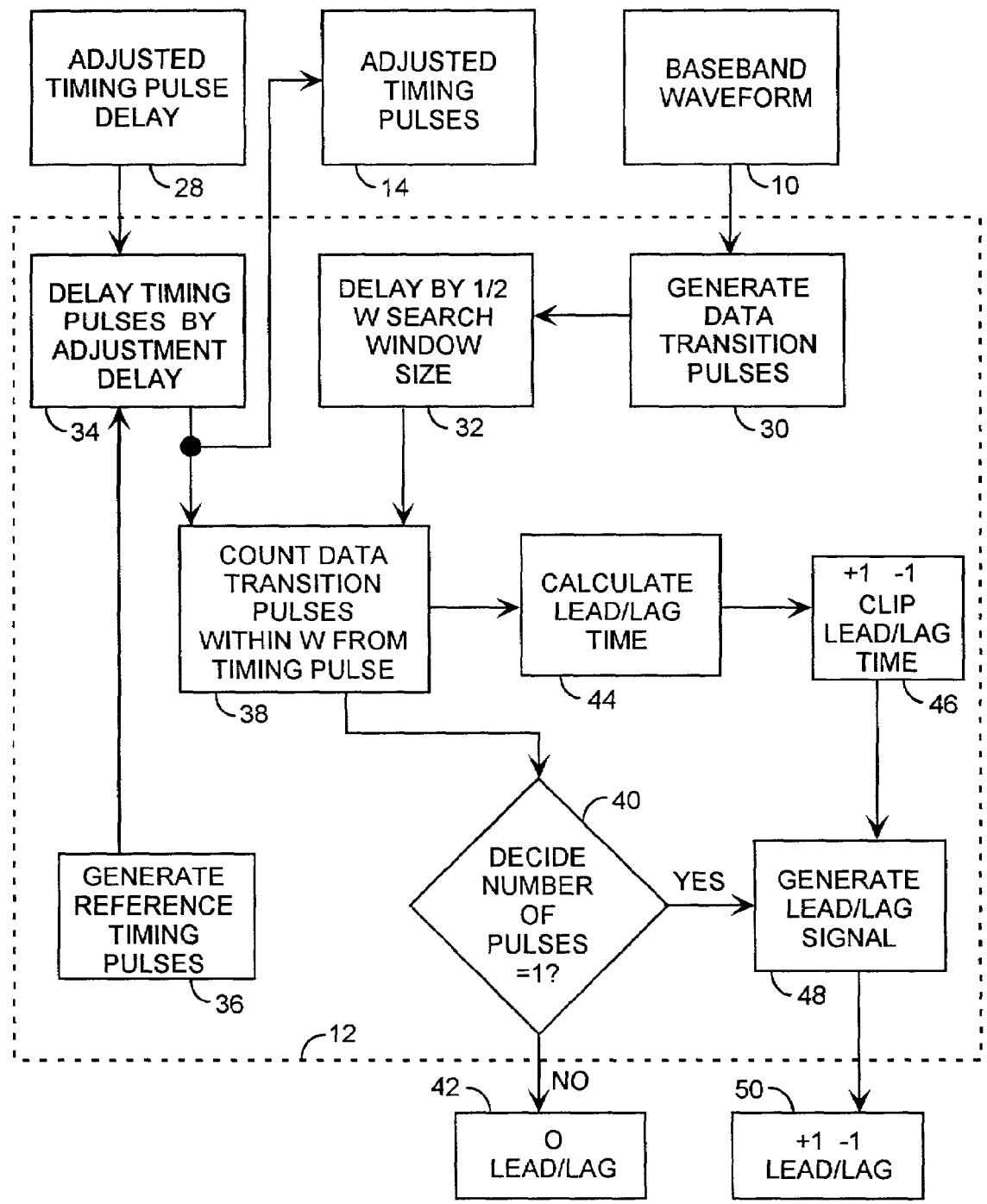
FIG. 2 is a process flow diagram of a pulse detector and comparator.

Referring to FIGS. 1 and 2, and more particularly to FIG. 2, the pulse detector and comparator 12 receives the adjusted timing pulse delay 28 from the timing pulse delay adjustor 26, and receives the baseband signal waveform 10 and provides the +1 lead, 0 nominal, and −1 lag signals to the random walk filter counter 16. The data transition pulses are generated 30 from the baseband signal waveform 10. The generation of the data transition pulses depends on the type of modulation used to communicate the encoded digital bit stream in the baseband waveform 10. The data transition pulses can be, for example, generated at each zero crossing of the baseband signal waveform, such as when using BPSK modulation. The baseband signal waveform 10 with BPSK modulation has transitions from plus one to minus one and from minus one to plus one. A transition pulse is generated at the time of zero crossing when a transition occurs. During a bit interval, no transition pulse, more than one transition pulse, but most often, only one transition pulse is generated.

The generated 30 data transition pulses are then delayed 32 by half of a search window size W. A window size W is typically the data bit period, but smaller search windows could also be used as long as there is a high probability that the data transition pulses are found within the windows. The W/2 delay 32 shifts the time of the data transition pulses to the center of a search window under ideal conditions, with the search window starting from an adjusted timing pulse. The search window size allows a data transition pulse to be detected under conditions that are not ideal, as the baseband signal waveform 10 is subject to noise causing the data transition pulse to randomly shift in time within the search window causing bit timing mismatches. Doppler shifts can also skew the data transition pulses. The random walk filter timing recovery loop serves to continuously adjust in time by the adjusted delay the adjusted timing pulses to be synchronized with the data transition pulses for improved bit timing tracking and consequently improved data detection by the data detector 11.

The baseband signal waveform 10 is used to generate the data transition pulses 30 delayed by half of the search window size, W 32. Reference timing pulses are generated 36 typically by a local oscillator, not shown, providing a digital clocking reference. The reference timing pulses are set to the expected bit clocking rate of the encoded digital bit stream of the baseband waveform 10 so as to match in time under ideal condition the adjusted timing pulses to the expected data transition pulses. The reference timing pulses are effectively shifted 34 in time by the adjusted timing pulse delay 28 from the timing pulse delay adjustor 26 to generate the adjusted timing pulses 14.

The number of data transition pulses within the search window W from an adjusted timing pulse are counted 38. The number of data transition pulses can be zero, one, or more than one. When determined 40 that the number of data transition pulses within the search window is not equal to one, there is insufficient or ambiguous information to indicate early or late arrival of the data transition pulse within the search window W, and the zero nominal lag signal is output 42 so that the random walk filter counter 16 does not increment nor decrement the running count. When the number of data transition pulses 40 is equal to one, then the lead or lag time between the adjusted timing pulse and the W/2 delayed data transition pulse is calculated 44. The calculated lead or lag time of arrival of the delayed data transition pulse is clipped 46 into a minus one early or plus one lag time, and a +1 lead or a −1 lag signal generated 48 and output 50 to the random walk filter counter 16. The data transition counting 44 counts number of data transition pulses that are within search window W from each successive timing pulse, and keeps track of the location of the first data transition pulse within the search window. The lead or lag time is calculated 44 for the first data transition pulse only as the pulse location in the search window minus half of the search window size. The lead and lag outputs 50 is presented when there is one, and only one, data transition pulse within the search window, thus reducing noise related ambiguity in the bit timing tracking. In this manner, the pulse detector and comparator 12 continuously increases or decreases the timing pulse delay from the timing pulse delay adjustor 26 to maintain synchronization between the adjusted timing pulses 14 and the baseband signal waveform 10.

The present invention uses a random walk filter counter in a digital timing recovery loop for reducing the drop lock rate by setting a threshold value in a timing recovery loop. The enhanced timing recovery loop offers faster acquisition time due to the threshold value setting that can be made adaptive to the channel environment. The timing recovery loop can be implemented using conventional digital technology for low costs and can use low sampling rates to reduce power usage. The timing recovery loop is applicable to a wide range of communication modulation methods, such as BPSK, QPSK, 16-QAM, 64-QAM, and GMSK. The random walk filter timing recovery loop can be applied to wireless communications such as cellular phones, mobile phones, and satellite decoders. Those skilled in the art can make enhancements, improvements, and modifications to the invention, and these enhancements, improvements, and modifications may nonetheless fall within the spirit and scope of the following claims.

What is claimed is:

1. A timing recovery loop for generating adjusted timing pulses from a baseband signal waveform encoding a self clocking digital bit stream, the timing recovery loop comprising, a pulse detector for generating data transition pulses from the baseband signal waveform, the pulse detector for comparing the data transition pulses with the adjusted timing pulses for generating lead signals and lag signals, the lead signals and lag signals being generated from the data transition pulses occurring within a window period of time referenced to the adjusted timing pulses, the data transition pulses corresponding to respective data bits of the self clocking digital bit stream with each of the data bits having a bit period, the data transition pulses being synchronized to the baseband waveform, a random walk counter for counting the early signals and lag signals over a plurality of bit periods for generating a running count, the lead signals and lag signals being generated when the data transition pulses lead and lag the adjusted timing pulses, a threshold comparator for determining when the running count exceeds a predetermined first threshold count value, and a timing pulse delay adjustor for adjusting an adjusted timing pulse delay communicated to the pulse detector for delaying the adjusted timing pulses for synchronizing the adjusted timing pulses with the data transition pulses and with the baseband signal over a plurality of bit periods when the running count exceeds the predetermined threshold count value, a data transition pulse generator for generating the data transition pulses, a window delay for delaying the data transition pulses by half of a search window to center the data transition pulses within respective search windows, a timing delay for delaying by a timing pulse delay the reference timing pulses into the adjusted timing pulses, the timing pulse delay being generated by the timing delay adjustor, the timing pulse delay being adjusted when the running count exceeds predetermined threshold value, a data transition pulse counter for counting the number of data transition pulses within the search window following an adjusted timing pulse, and a lead and lag generator for generating lead and lag signals for early and late arrivals of the data transition pulses relative to the adjusted timing pulses when one and only one data transition pulse occurs within a respective one of the search windows following a respective one of the adjusted timing pulses.

2. The timing recovery loop of claim 1 further comprising,
a data detector for generating a reconstructed digital bit stream by sampling the baseband signal waveform by the adjusted timing pulses.

3. The timing recovery loop of claim 1 further comprising,
a threshold count value selector for selecting the first threshold count value.

4. The timing recovery loop of claim 1 further comprising,
a threshold count value selector for selecting the first threshold count value, and
an adaptive means for monitoring the rate at which the timing pulse delay is adjusted, the threshold value count selector adaptively selecting different first threshold count values when the adjustment rate exceeds a predetermined rate being a second threshold count value.

5. The timing recovery loop of claim 1 further comprising,
a count magnitude generator for generating the magnitude count from the running count, the magnitude count being fed to the threshold count comparator for determining when the running count exceeds the predetermined first threshold count value, and
a count sign clipper for generating a count sign from the running count, the count sign being fed to the timing pulse delay adjustor for generating a timing pulse delay to adjust the adjusted timing pulses, the sign count for increasing the timing pulse delay when the data transition pulses arrive late relative to the adjusted timing pulses and for decreasing the timing pulse delay when the data transition pulses arrive early relative to the adjusted timing pulses.

6. The timing recovery loop of claim 1 wherein the pulse detector comprises,
a data transition pulse generator for generating the data transition pulses,
a timing delay for delaying reference timing pulses into the adjusted timing pulses, and
a lead and lag generator for generating lead and lag signals for early and late arrivals of the data transition pulses relative to the adjusted timing pulses.

7. The timing recovery loop of claim 1 wherein the pulse detector comprises,
a data transition pulse generator for generating the data transition pulses,
a timing delay for delaying reference timing pulses into the adjusted timing pulses,
a data transition pulse counter for counting the number of data transition pulses within a search window following an adjusted timing pulse, and
a lead and lag generator for generating lead and lag signals for early and late arrivals of the data transition pulses relative to the adjusted timing pulses when one and only one data transition pulse occurs within each search window following an adjusted timing pulse.

8. The timing recovery loop of claim 1, wherein,
the random walk counter sums the lead signals and lag signals as the running count.

9. A timing recovery loop for generating adjusted timing pulses from a baseband signal waveform having zero crossings and encoding a self clocking digital bit stream, the timing recovery loop comprising,
a pulse detector for generating data transition pulses from the zero crossings of the baseband signal waveform, the pulse detector for comparing the data transition pulses with the adjusted timing pulses for generating lead signals and lag signals, the lead signals and lag signals being generated from the data transition pulses occurring within a window period of time referenced to the adjusted timing pulses, the data transition pulses corresponding to respective data bits of the self clocking digital bit stream with each of the data bits having a bit period, the data transition pulses being synchronized to the baseband waveform,
a random walk counter for counting the lead signals and lag signals over a plurality of bit periods for generating a running count, the lead signals and lag signals being generated when the data transition pulses lead and lag the adjusted timing pulses,
a threshold comparator for determining when the running count exceeds a predetermined first threshold count value, and
a timing pulse delay adjustor for adjusting an adjusted timing pulse delay communicated to the pulse detector for delaying the adjusted timing pulses for synchronizing the adjusted timing pulses with the data transition pulses and with the baseband signal over a plurality of bit periods when the running count exceeds the predetermined threshold count value,
a data transition pulse generator for generating the data transition pulses,
a window delay for delaying the data transition pulses by half of a search window to center the data transition pulses within respective search windows,
a timing delay for delaying by a timing pulse delay the reference timing pulses into the adjusted timing pulses, the timing pulse delay being generated by the timing delay adjustor, the timing pulse delay being adjusted when the running count exceeds predetermined threshold value,
a data transition pulse counter for counting the number of data transition pulses within the search window following an adjusted timing pulse, and
a lead and lag generator for generating lead and lag signals for early and late arrivals of the data transition pulses relative to the adjusted timing pulses when one and only one data transition pulse occurs within a respective one of the search windows following a respective one of the adjusted timing pulses.

10. The timing recovery loop of claim 8 wherein,
the baseband waveform signal having zero crossings encodes the digital bit stream using a modulation method selected from the group consisting of BPSK, QPSK, GMSK, 16-QAM, and 64-QAM.

* * * * *